(12) United States Patent
Sumimoto et al.

(10) Patent No.: US 6,995,544 B2
(45) Date of Patent: Feb. 7, 2006

(54) GENERATOR CONTROL APPARATUS

(75) Inventors: Katsuyuki Sumimoto, Tokyo (JP); Junya Sasaki, Tokyo (JP); Kyoko Higashino, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 119 days.

(21) Appl. No.: 10/702,742

(22) Filed: Nov. 7, 2003

(65) Prior Publication Data

US 2004/0239295 A1  Dec. 2, 2004

(30) Foreign Application Priority Data

May 29, 2003  (JP) .............................. 2003-153013

(51) Int. Cl.
H02J 7/14  (2006.01)
H02J 7/00  (2006.01)
H02P 9/04  (2006.01)

(52) U.S. Cl. .............................. 322/25; 322/7; 322/19; 322/28

(58) Field of Classification Search .................... 322/7, 322/17, 19, 25, 28, 33–34
See application file for complete search history.

(56) References Cited

U.S. PATENT DOCUMENTS

| | | | |
|---|---|---|---|
| 4,419,618 A * | 12/1983 | Gretsch | 322/7 |
| 4,602,872 A * | 7/1986 | Emery et al. | 374/152 |
| 4,891,948 A * | 1/1990 | Kure-Jensen et al. | 60/645 |
| 4,945,277 A * | 7/1990 | Iwatani et al. | 340/455 |
| 5,089,766 A * | 2/1992 | Iwatani | 322/25 |
| 5,256,959 A * | 10/1993 | Nagano et al. | 322/25 |
| 5,321,231 A * | 6/1994 | Schmalzriedt et al. | 219/497 |
| 5,453,904 A * | 9/1995 | Higashiyama et al. | 361/94 |
| 5,675,238 A * | 10/1997 | Asao | 322/28 |
| 5,701,044 A * | 12/1997 | Emshoff et al. | 310/54 |
| 5,754,030 A * | 5/1998 | Maehara et al. | 322/19 |
| 6,377,197 B1 * | 4/2002 | Rantanen | 341/118 |
| 6,612,502 B2 * | 9/2003 | Poucher | 236/78 D |
| 6,902,117 B1 * | 6/2005 | Rosen | 236/51 |
| 6,909,989 B2 * | 6/2005 | Thompson et al. | 702/182 |
| 6,914,764 B2 * | 7/2005 | Clabes et al. | 361/103 |
| 6,921,199 B2 * | 7/2005 | Aota et al. | 374/178 |
| 6,924,758 B1 * | 8/2005 | Lorenz | 341/144 |

FOREIGN PATENT DOCUMENTS

| | | |
|---|---|---|
| JP | 02-131333 A | 5/1990 |
| JP | 2001-178015 | 6/2001 |
| JP | 2001178015 A * | 6/2001 |

* cited by examiner

Primary Examiner—Darren Schuberg
Assistant Examiner—Pedro J. Cuevas
(74) Attorney, Agent, or Firm—Sughrue Mion, PLLC

(57) ABSTRACT

An IC regulator for controlling an alternator by changing contents of control in dependence on ambient temperature includes a control voltage limiter (2), a field current controller (3), a temperature sensor (4), a first comparator (5) for comparing the ambient temperature (T) with an activation temperature (TP1) and a reset temperature (TS1), and a second comparator (6) for comparing the ambient temperature (T) with a second activation temperature (TP2). The first comparator (5) outputs a limiter control signal (C2) when the ambient temperature (T) exceeds the first activation temperature (TP1) while resetting the limiter control when the temperature (T) becomes lower than the first reset temperature (TS1). The second comparator (6) outputs a field current interrupt signal (C3) when the ambient temperature (T) exceeds a second activation temperature (TP2) while resetting the signal (C3) when the temperature (T) becomes lower than the second activation temperature (TP2).

9 Claims, 3 Drawing Sheets

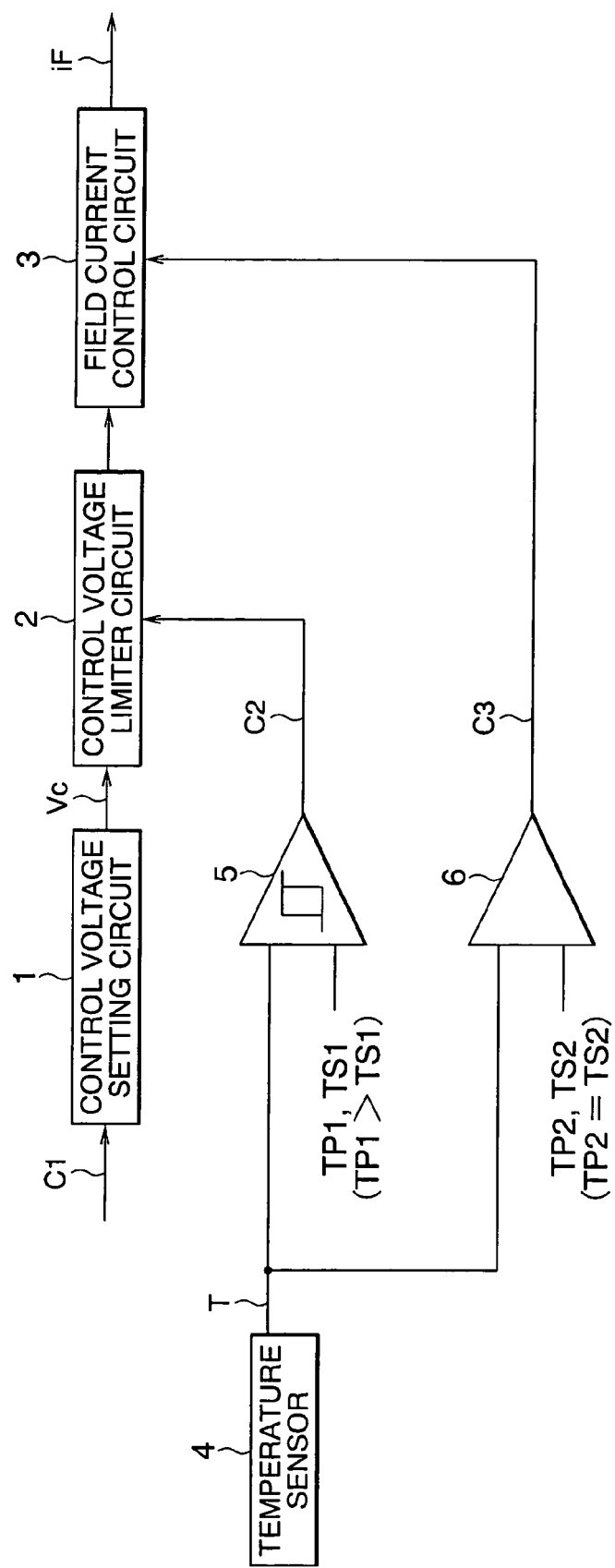

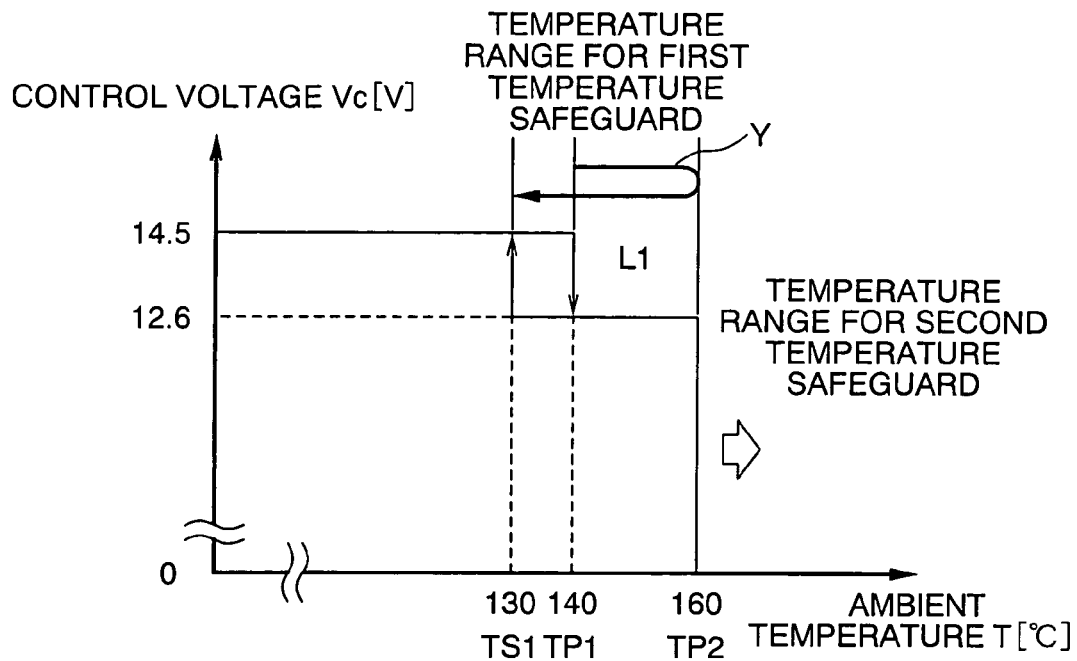
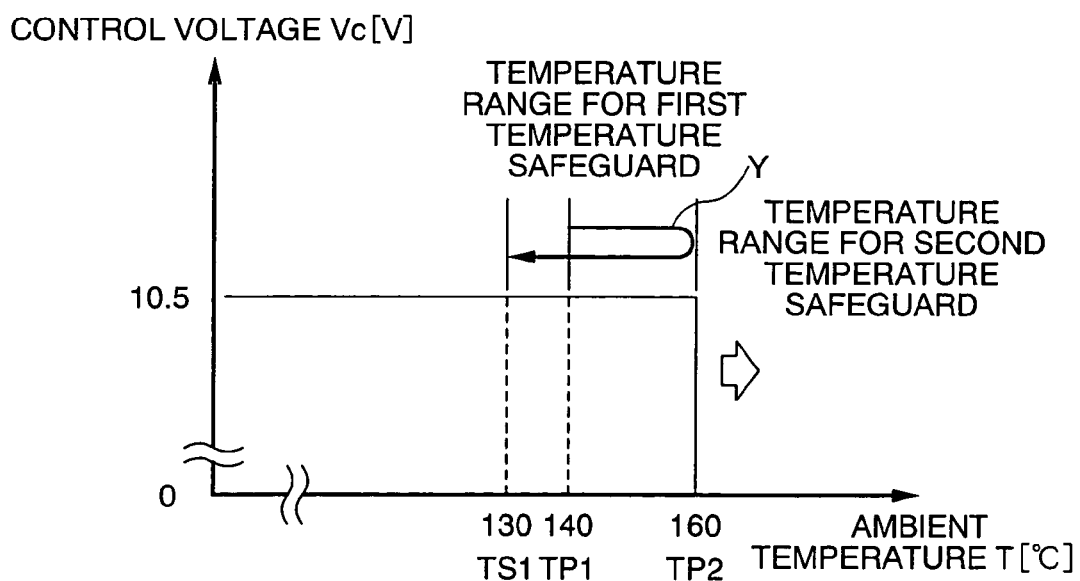

GENERATOR CONTROL APPARATUS

BACKGROUND OF THE INVENTION

1. Field of the Invention

The present invention generally relates to an electric generator control apparatus for controlling a field current of an electric generator on the basis of a control voltage conforming to a voltage indicating command. More particularly, the present invention is concerned with an electric generator control apparatus which is capable of enhancing the performance and the efficiency of an electric generator by monitoring the temperature of a regulator itself and changing contents of the control in dependence on the temperature behavior.

2. Description of Related Art

In general, the electric generator control apparatus (hereinafter also referred to as the regulator or IC regulator for the convenience of description) for regulating or controlling the field current and the generation voltage of the electric generator (hereinafter also referred to as the alternator for the convenience of description) is disposed internally of a bracket of the alternator. Further, a rectifier for rectifying a three-phase AC current is disposed within the bracket substantially in close vicinity to the regulator. (For more particulars, reference may have to be made to e.g. Japanese Patent Application Laid-Open Publication No. 3098223 (JP-A-3098223).)

In other words, an integrated circuit (IC) constituting the regulator, a diode or diodes constituting the rectifier and others exist mixedly within the bracket.

Additionally, a stator of the alternator is fittingly supported by a pair of brackets, being connected between the regulator and the rectifier by wiring conductors.

The individual constituents or parts mentioned above generates heat in the course of electricity generating operation. Thus, by cooling them with air circulation produced by a rotary fan, liquid-cooling or the like measures, performances of the individual constituents or parts are protected against degradation of performance and protected from injury.

In this conjunction, it is noted that the regulator and other constituents or parts differ from one another in respect to the temperature limit in operation. Nevertheless, no concerning the measures for the safeguard against the temperature, consideration is paid to the temperature characteristics of the other parts than the regulator and a battery in practice.

Accordingly, there may arise such undesirable situation that the operation temperature determined acceptable for the regulator exceeds the limit temperatures of the other constituents or parts. In that case, if the temperature control is performed continuously only for the regulator, the prevailing situation will become worse.

Among others, control for the generation of electricity will become inadequate in the atmosphere of high temperature, incurring ineffectiveness in the generator operation.

As is now apparent from the above, the conventional electric generator control apparatus or regulator for short is mixedly disposed within the bracket together with the other alternator built-in parts such as the rectifier or the like. In this conjunction, the temperature limit value of the IC regulator differs from the temperature limit values of the build-in or internal parts of the alternator, and it is impossible to realize matching of the temperature control between the regulator and the other parts. Thus, there exists a problem that the temperature compensation or safeguard for the regulator and the other parts is insufficient.

SUMMARY OF THE INVENTION

In the light of the state of the art described above, it is an object of the present invention to provide an electric generator control apparatus which is capable of improving the performance and the efficiency of the electric generator with enhanced reliability by monitoring the temperature of the regulator itself and changing the contents of control in dependence on the temperature behavior.

In view of the above and other objects which will become apparent as the description proceeds, there is provided according to a general aspect of the present invention an electric generator control apparatus which includes a control voltage limiter circuit for limiting a control voltage set in conformance with a voltage indicating command in response to a limiter circuit control signal mentioned underneath, a field current control circuit for controlling a field current for an electric generator on the basis of the control voltage supplied through the medium of the control voltage limiter circuit, a temperature sensor for detecting an ambient temperature, a first comparator for comparing the ambient temperature with a first activation temperature and a first reset temperature, respectively, and a second comparator for comparing the ambient temperature with a second activation temperature and a second reset temperature higher than the first activation temperature.

The first comparator is so designed as to output a limiter circuit control signal for putting into operation the control voltage limiter circuit when the ambient temperature becomes higher than the first activation temperature inclusive while resetting the limiter circuit control signal when the ambient temperature becomes lower than the first reset temperature inclusive.

On the other hand, the second comparator is so designed as to output a field current interrupt control signal for interrupting the field current control circuit when the ambient temperature becomes higher than the second activation temperature inclusive while clearing or resetting the field current interrupt control signal when the ambient temperature becomes lower than the second reset temperature inclusive.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 1 is a functional block diagram showing a functional arrangement of an IC regulator (i.e., an electric generator control apparatus) according to a first embodiment of the present invention in association with circuit operations thereof;

FIG. 2 is a view for graphically illustrating operation of the regulator according to the first embodiment of the invention at various temperatures in the case where a control voltage is 14.5 volts;

FIG. 3 is a view for graphically illustrating operation of the regulator according to the first embodiment of the invention at various temperatures in the case where the control voltage is 10.5 volts.

DESCRIPTION OF THE PREFERRED EMBODIMENTS

Figure 4:
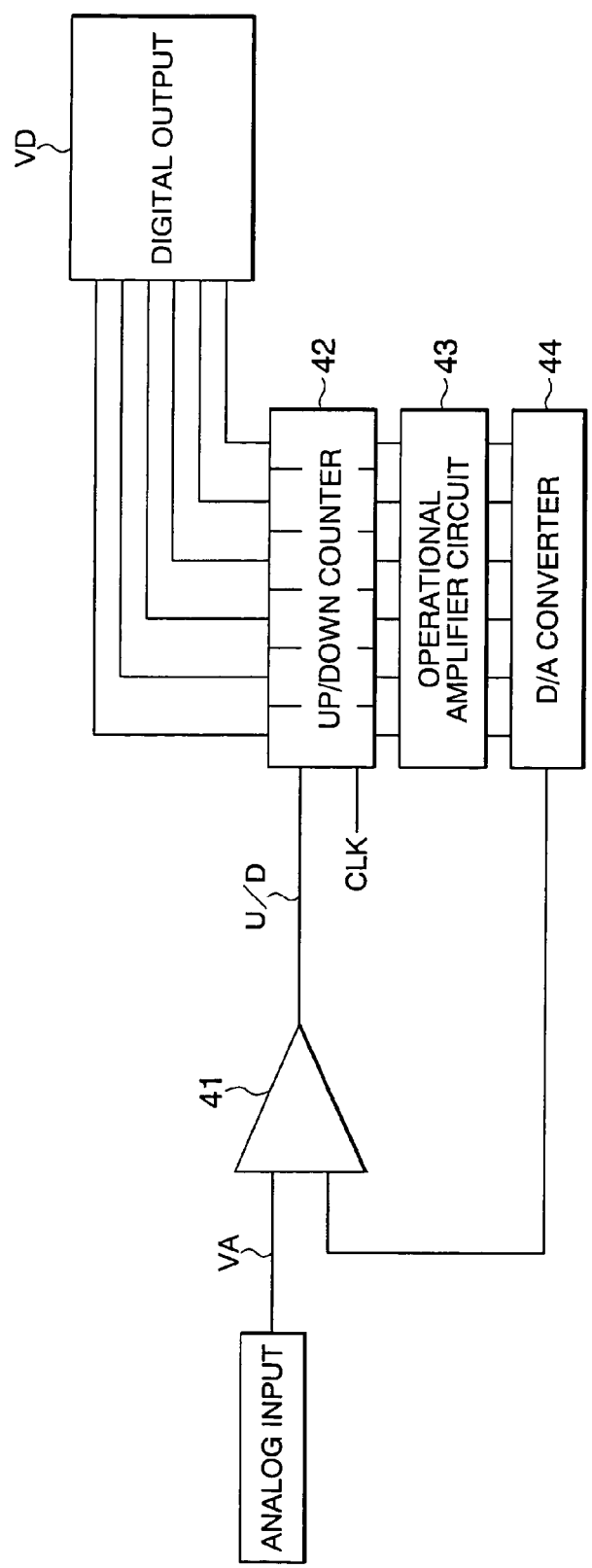
FIG. 4 is a block diagram showing a typical structure of an A/D (analog-to-digital) converter employed in a temperature sensor of the regulator according to the first embodiment of the invention.

Now, the present invention will be described in detail in conjunction with preferred embodiments thereof by reference to the drawings. In the following description, like reference characters designate like or corresponding parts throughout the several views.

Embodiment 1

FIG. 1 is a functional block diagram for illustrating a functional arrangement of the IC regulator (i.e., electric generator control apparatus) according to a first embodiment of the present invention together with the circuit operation thereof. FIGS. 2 and 3 are views for graphically illustrating operation of the regulator according to the first embodiment of the invention, wherein FIG. 2 is a view for graphically illustrating operation of the regulator at various temperatures in the case where a control voltage described hereinafter is 14.5 volts while FIG. 3 is a view for graphically illustrating operation of the regulator at various temperatures in the case where the control voltage is 10.5 volts. Further, FIG. 4 is a block diagram showing an exemplary structure of an A/D (analog-to-digital) converter 40 employed in a temperature sensor 4 of the regulator shown in FIG. 1.

Referring to FIG. 1, the regulator (i.e., the generator control apparatus) denoted generally by a reference numeral 10 is implemented in the form of an IC (integrated circuit) and includes a control voltage setting circuit 1 for setting a control voltage Vc in conformance with a voltage indicating command C1 for the control voltage, which command is issued from an external unit (not shown), a control voltage limiter circuit 2 and a field current control circuit 3 for regulating or controlling a field current iF of the alternator (i.e., electric generator) in dependence on the control voltage Vc, a temperature sensor 4 for monitoring and detecting the ambient temperature of the regulator 10 to thereby generate a detected value of the ambient temperature T [° C.], and a pair of first and second comparators 5 and 6 provided in parallel on the output side of the temperature sensor 4.

The temperature sensor 4 which constitutes at least a major part of a temperature monitoring circuit for the regulator 10 is composed of a diode (not shown) which exhibits a temperature dependency characteristic, and an A/D (analog-to-digital) converter 40 (see FIG. 4) for converting a voltage drop of a value VA occurring across the diode into a digital output value (indicating the ambient temperature T) to be outputted.

One comparator (first comparator) 5 of the paired comparators connected in parallel on the output side of the temperature sensor 4 compares the detected ambient temperature T with a first activation temperature TP1 and a first reset temperature TS1 (with a hysteresis) for a first temperature safeguard (described later on) to thereby output a limiter circuit control signal C2 for putting into operation the control voltage limiter circuit 2 when the ambient temperature T exceeds the first activation temperature TP1 while clearing or resetting the limiter circuit control signal C2 when the ambient temperature T becomes lower than the first reset temperature TS1, to thereby clear the limitation imposed on the control voltage Vc.

On the other hand, the other one (second comparator) 6 of the parallel-connected comparators is designed to compare the detected ambient temperature T with a second activation temperature TP2 (where TP2>TP1) for a second temperature safeguard (described later on) to thereby output a field current interrupt control signal C3 for disabling or interrupting the field current control circuit 3 when the ambient temperature T exceeds the second activation temperature TP2 while resetting the field current interrupt control signal C3 when the ambient temperature T becomes lower than a second reset temperature TS2 (which is set equal to the second activation temperature TP2).

Because of the operation of the paired comparators 5 and 6 described above, contents of the control performed by the regulator 10 on the basis of at least the two activation temperatures TP1 and TP2 differ from the ordinary control operation.

Further, the first comparator 5 puts into operation the control voltage limiter circuit 2 in dependence on the first activation temperature TP1 which serves as a comparison reference for setting the control voltage Vc of a value smaller than the ordinary one.

Furthermore, the first reset temperature TS1 serving as the resetting reference for the comparison performed by the first comparator 5 exhibits hysteresis for the first activation temperature TP1 and is set to a value smaller than that of the first activation temperature TP1.

On the other hand, the second activation temperature TP2 serving as the reference for the comparison performed by the second comparator 6 is set at a value greater than that of the first activation temperature TP1 (upper limit value) of the first comparator 5, and thus the non-activation temperature range of several ten degrees (20° C. in the case of the IC regulator according to the instant embodiment of the invention) intervenes until the second comparator 6 is put into operation even when the ambient temperature T increases after the first comparator 5 has been actuated.

Further, the second activation temperature TP2 at which the field current interrupt control signal C3 is outputted by the second comparator 6 coincides with the second reset temperature TS2 at which the field current interrupt control signal C3 is cleared. To say in another way, the second comparator 6 is arranged to operate without accompanying any hysteresis.

Now referring to FIG. 4, the A/D converter 40 incorporated in the temperature sensor 4 is comprised of a comparator 41 for comparing the voltage drop value (analog value) VA of the diode with a counter value (D/A (digital-to-analog) conversion value described hereinafter) to thereby output an up/down switching signal U/D, an up/down counter 42 for generating a digital output value VD (corresponding to the ambient temperature T) by counting up/down a clock signal CLK in response to the up/down switching signal U/D, an operational amplifier circuit 43 for performing arithmetic operation on the basis of the output value of the up/down counter 42, and a D/A (digital-to-analog) converter (DAC) 44 for converting the output value of the operational amplifier circuit 43 into an analog value which is then supplied to the comparator 41.

Next, referring to FIGS. 2 to 4, description will be made of operation of the IC regulator 10 according to the first embodiment of the invention.

At first, the control voltage setting circuit 1 sets the control voltage Vc to a value within a range of e.g. 10.7 to 16 volts in response to the voltage indicating command C1 issued from the external unit.

The control voltage limiter circuit 2 and the field current control circuit 3 cooperate to control or regulate the field current iF of the alternator (not shown) in conformance with the voltage value indicated by the control voltage Vc.

On the other hand, the temperature sensor 4 is so designed as to detect the ambient temperature T of the regulator 10 on the basis of the digital output value VD representing the voltage drop value VA by taking into consideration the fact that the voltage drop value VA (see FIG. 4) of the diode exhibits a linear temperature dependency characteristic.

In this conjunction, it is noted that the temperature of the diode depends on the current flowing through the diode itself. This current will be referred to as the diode current. Accordingly, if the diode current control circuit is constituted by using an ordinary resistor or resistors, the temperature characteristic of the diode is susceptible to the influence of the temperature characteristic of the resistor itself as well as variation of the source voltage, giving rise to inconvenience.

Such being the circumstances, the diode current flowing through the diode incorporated in the temperature sensor 4 is supplied from a constant current power supply source (not shown) so that a constant current and hence operation stability can be ensured over the whole temperature range.

Incidentally, the current value of the constant current power supply source is adjusted in advance in the manufacturing process of the regulator 10. Similarly, the value of the voltage drop occurring across the diode of the temperature sensor 4 is adjusted-in advance at a room temperature in the manufacturing process of the regulator 10.

As can be seen in FIG. 4, the voltage drop value VA of the diode is inputted to the comparator 41 which is incorporated in the A/D converter 40 to be thereby converted into the up/down switching signal U/D which is then inputted to the up/down counter 42.

The up/down counter 42 serves to feed back a reference value for the comparator 41 by way of the operational amplifier circuit 43 and the D/A converter 44 to thereby effectuate such up/down switching operation that the digital output value VD approaches the voltage drop value (analog input value) VA.

Thus, the digital output value VD becomes saturated in the vicinity of the voltage drop value (analog input value) VA.

When the digital output value VD is once saturated, as described above, higher response performance than the conventional A/D converter of successive approximation type, integration type or the like type can be realized because the updating rate of the digital output value VD depends on the clock signal CLK (basic frequency) of the up/down counter 42, which is advantageous from the standpoint of the response performance as well as the operation speed.

Relation between the ambient temperature T detected in this manner and the control voltage Vc of the control voltage setting circuit 1 can be represented such as illustrated, for example, in FIG. 2.

Referring to FIG. 2, it is assumed that the voltage indicating command C1 issued from the external unit (not shown) is equivalently represented by the voltage of 14.5 volts. Thus, the control voltage Vc is so controlled at the room temperature that it assumes the voltage value of "14.5 volts" which coincides with the command voltage value.

On the other hand, when the ambient temperature T rises up to the first activation temperature TP1 (=140° C.) for the first temperature safeguard, the first comparator 5 shown in FIG. 1 is put into operation, which results in that the limiter circuit control signal C2 is generated and thus the function of the control voltage limiter circuit 2 is started. Thus, the first temperature safeguard is validated, as a result of which the control voltage Vc is limited to "12.6 volts", as indicated by an arrow L1 in FIG. 2.

By applying limitation on the control voltage Vc in the manner described above, heat generation of the IC regulator 10 itself can be suppressed.

At this juncture, it should be mentioned that the first activation temperature TP1 (=140° C.) for the first temperature safeguard is selectively set to the upper limit value which is at least required for sustaining the voltage of the battery (not shown) which supplies the electric power to the regulator 10.

Further, in association with the first temperature safeguard, hysteresis is provided between the first activation temperature TP1 and the first reset temperature TS1. In the case of the example illustrated in FIG. 2, the first reset temperature TS1 is set at 130° C.

More specifically, when the ambient temperature T lowers under the action of cooling effected by a fan or the like, the control voltage Vc is again restored to 14.5 volts at the time point when the ambient temperature T becomes lower than the first reset temperature TS1 (130° C.). Thus, the temperature range for the first temperature safeguard may be represented by a curvilinear arrow Y shown in FIG. 2.

By providing hysteresis in this manner, the temperature of the IC regulator 10 can effectively be lowered.

On the other hand, in the regulator 10, such control mode is adopted that an upper limit value is set for the control voltage Vc. Consequently, even when the first temperature safeguard is validated at the first activation temperature TP1 (=140° C.) in response to the voltage indicating command C1 of "10.5 volts", the control voltage Vc continues to remain unchanged and held at "10.5 volts", as is illustrated in FIG. 3, by way of example.

Ordinarily, the temperature of the alternator lowers under the effect of the first temperature safeguard validated by the first comparator 5 and the control voltage limiter circuit 2. However, there may unwantedly exist such possibility that the temperature of the alternator continues to rise further for some reason unexpected.

In that case, at the time point when the second activation temperature TP2 (=160° C.) for the second temperature safeguard has been reached, the second comparator 6 is put into operation, as a result of which the field current interrupt control signal C3 is inputted to the field current control circuit 3 to interrupt or break the field current iF fed to the alternator.

In this conjunction, it is to be noted that the second temperature safeguard is validated by the second comparator 6 independently from the voltage value of the voltage indicating command C1, differing from the first temperature safeguard validated by the first comparator 5.

Further, in the second temperature safeguard, importance is put on the response performance. For this reason, the second reset temperature for the second temperature safeguard is set at the same value as the second activation temperature TP2.

It should however be added that the second activation temperature TP2 for the second temperature safeguard is selectively set by taking into consideration that the exciting frequency of the rotor of the electric generator or alternator does not oscillate even when the activating operation and the resetting operation are repeated.

Furthermore, in either the first temperature safeguard or the second temperature safeguard, a generation ratio gradual increasing processing is executed upon resetting operation with a view to reducing or mitigating occurrence of torque shock in the electric generator, i.e., alternator.

As can be appreciated from the foregoing description, by providing the temperature sensor 4 in association with the regulator 10 for supervising or monitoring the ambient temperature T of the IC regulator itself and changing the contents of the control performed by the control voltage limiter circuit 2 and the field current control circuit 3 in response to at least two activation temperatures TP1 and TP2 so that the controls of the control voltage limiter circuit 2 and the field current control circuit 3 differ from those for the normal operation, there can be ensured safety for the operation and use of the alternator or electric generator and the structural components thereof provided in the vicinity of the regulator 10. Thus, the regulator 10 (electric generator control apparatus) of high reliability which is capable of enhancing the performance and the efficiency of the alternator (electric generator) can be realized.

Further, by setting the control voltage Vc at a lower value than the ordinary value for the first activation temperature TP1 of the first temperature safeguard and providing hysteresis for the first reset temperature TS1 of the first temperature safeguard, not only the control can smoothly be changed but also the heat generation of the IC regulator 10 itself can effectively be suppressed without exerting influence to the control of the alternator.

Besides, because the second activation temperature TP2 for the second temperature safeguard is higher than the upper limit value of the first activation temperature TP1 for the first temperature safeguard and has a non-activation temperature range of several tens ° C. (e.g. 20° C.) in succession to the actuation of the first comparator 5 (refer to the activation temperature range shown in FIGS. 2 and 3), the activation temperatures of two levels for the different control contents are rendered to be non-continuous, which in turn means that the start of the control and the end of the control for the activation temperatures of two levels, respectively, can be performed with high stability.

Additionally, by interrupting or breaking the field current iF and executing the resetting operation without accompanying hysteresis at the second activation temperature TP2 for the second temperature safeguard which is higher than the first activation temperature TP1 for the first temperature safeguard, it is possible to protect the constituent or parts from injuries due to overvoltage because the field current iF can be broken with high response at a high temperature.

Although the foregoing description has been made on the presumption that the regulator 10 is disposed within the alternator bracket, the invention is not restricted thereto. The regulator 10 may be disposed adjacent to the bracket. In that case, substantially same advantageous effects as those described above can be obtained as well.

Many features and advantages of the present invention are apparent from the detailed description and thus it is intended by the appended claims to cover all such features and advantages of the apparatus which fall within the spirit and scope of the invention. Further, since numerous modifications and changes will readily occur to those skilled in the art, it is not desired to limit the invention to the exact construction and operation illustrated and described. Accordingly, all suitable modifications and equivalents may be resorted to, falling within the scope of the invention.

What is claimed is:

1. An electric generator control apparatus, comprising:
a control voltage limiter circuit for limiting a control voltage set in conformance with a voltage indicating command in response to a limiter circuit control signal mentioned underneath;
a field current control circuit for controlling a field current for an electric generator on the basis of said control voltage supplied through the medium of said control voltage limiter circuit;
a temperature sensor for detecting an ambient temperature;
a first comparator for comparing said ambient temperature with a first activation temperature and a first reset temperature, respectively; and
a second comparator for comparing said ambient temperature with a second activation temperature and a second reset temperature higher than said first activation temperature,
wherein said first comparator is so designed as to output a limiter circuit control signal for putting into operation said control voltage limiter circuit when said ambient temperature becomes higher than said first activation temperature inclusive while resetting said limiter circuit control signal when said ambient temperature becomes lower than said first reset temperature inclusive, and
wherein said second comparator is so designed as to output a field current interrupt control signal for interrupting said field current control circuit when said ambient temperature becomes higher than said second activation temperature inclusive while resetting said field current interrupt control signal when said ambient temperature becomes lower than said second reset temperature inclusive.

2. An electric generator control apparatus according to claim 1,
wherein said first reset temperature is set at a value lower than said first activation temperature so as to exhibit hysteresis for said first activation temperature, and
wherein said control voltage limiter circuit sets said control voltage at a value lower than an ordinary value when said ambient temperature becomes higher than said first activation temperature inclusive.

3. An electric generator control apparatus according to claim 1,
wherein said second comparator has a non-activation temperature range of several ten degrees in which said second comparator remains unactuated before said second comparator is actuated due to increasing of said ambient temperature after actuation of said first comparator.

4. An electric generator control apparatus according to claim 1,
wherein said second reset temperature for resetting said field current interrupt control signal is set to a same value as said second activation temperature, and
wherein said field current control circuit breaks a field current of said electric generator when said ambient temperature exceeds said second activation temperature.

5. An electric generator control apparatus, comprising:
a control voltage limiter circuit limiting a control voltage supplied to a field current control circuit;

the field current control circuit controlling, based on the supplied control voltage from the control voltage limiter circuit, a field current supplied to an electric generator;

a temperature sensor detecting an ambient temperature of the electric generator control apparatus;

a first comparator comparing said detected ambient temperature with at least one of a first activation temperature and a first reset temperature and outputting a limiter circuit control signal supplied as input to the control voltage limiter circuit; and a second comparator comparing said detected ambient temperature with at least one of a second activation temperature and a second reset temperature, said second activation temperature and second reset temperature are higher than said first activation temperature, and outputting a field current interrupt control signal supplied as input to the field current control circuit, wherein said first comparator activates said control voltage limiter circuit when said detected ambient temperature is higher than or equal to said first activation temperature, and said first comparator resets the control voltage limiter circuit when said detected ambient temperature becomes lower than or equal to said first reset temperature, and wherein said second comparator disables said field current control circuit when said detected ambient temperature becomes higher than or equal to said second activation temperature, and said second comparator enables said field current control circuit when said ambient temperature becomes lower than or equal to said second reset temperature.

6. The electric generator control apparatus according to claim 5, wherein:

the second activation temperature is higher than the first activation temperature, the first reset temperature is set at a value lower than the first activation temperature, the second reset temperature is equivalent to the second activation temperature, and when said detected ambient temperature exceeds the second activation temperature, the field current control circuit breaks the field current of the electric generator.

7. The electric generator control apparatus according to claim 5, wherein the temperature sensor comprises a diode, a comparator, a counter, and a digital-analog converter.

8. The electric generator control apparatus according to claim 7, wherein a value output by the counter is converted into an analog value by the digital-analog converter and is input into the comparator and wherein the comparator compares voltage drop detected by the diode with the inputted analog value.

9. The electric generator control apparatus according to claim 8, wherein the value output by the counter is input into an operational amplifier performing arithmetic operations and outputting a resulting value to the digital-analog converter, and wherein the temperature sensor outputs a digital value that is the detected ambient temperature.

* * * * *